United States Patent
DesChamps et al.

(10) Patent No.: US 8,505,311 B2
(45) Date of Patent: Aug. 13, 2013

(54) TURBOMACHINE WITH SEPARATE FUEL INJECTION SYSTEMS, USING IDENTICAL SEALING JOINTS

(75) Inventors: Françoise DesChamps, Dammarie les Lys (FR); Alain Meriguet, Dammarie les Lys (FR); Christophe Pieussergues, Nangis (FR); Jean-Luc Voisembert, Mormant (FR)

(73) Assignee: SNECMA, Paris (FR)

( * ) Notice: Subject to any disclaimer, the term of this patent is extended or adjusted under 35 U.S.C. 154(b) by 926 days.

(21) Appl. No.: 12/625,955

(22) Filed: Nov. 25, 2009

(65) Prior Publication Data

US 2010/0132363 A1    Jun. 3, 2010

(30) Foreign Application Priority Data

Nov. 28, 2008 (FR) ...................................... 08 58094

(51) Int. Cl.
*F02C 7/20* (2006.01)

(52) U.S. Cl.
USPC ........................................................... 60/796

(58) Field of Classification Search
USPC .................................. 60/740, 746, 796–800
See application file for complete search history.

(56) References Cited

U.S. PATENT DOCUMENTS

| 3,398,529 | A | * | 8/1968 | Schmitz et al. | 60/796 |
| 4,441,323 | A | * | 4/1984 | Colley | 60/737 |
| 4,466,240 | A | * | 8/1984 | Miller | 60/796 |
| 5,316,346 | A | * | 5/1994 | Maurer | 285/23 |
| 5,771,696 | A | * | 6/1998 | Hansel et al. | 60/739 |
| 2008/0105237 | A1 | | 5/2008 | Gandza | |

FOREIGN PATENT DOCUMENTS

| DE | 1 250 196 | 9/1967 |
| EP | 0 296 058 A1 | 12/1988 |
| EP | 0 455 559 A1 | 11/1991 |
| GB | 2 097 112 A | 10/1982 |

\* cited by examiner

*Primary Examiner* — Phutthiwat Wongwian
(74) *Attorney, Agent, or Firm* — Oblon, Spivak, McClelland, Maier & Neustadt, L.L.P.

(57) ABSTRACT

An aircraft turbomachine with a housing, and first and second fuel injection systems, where each system includes an injector fitted with an attachment plate traversed by three mounting holes positioned according to a first configuration for the first system and according to a second configuration distinct from the first for the second system. Each system also includes a reception device installed on the housing, a sealing joint interposed between the plate and the reception device, and securing screws which attach the plate on to its reception device. Sealing joints are identical for the first and second fuel injection systems.

15 Claims, 9 Drawing Sheets

TURBOMACHINE WITH SEPARATE FUEL INJECTION SYSTEMS, USING IDENTICAL SEALING JOINTS

TECHNICAL FIELD

The present invention relates generally to the field of fuel injection systems for aircraft turbomachines, and more specifically to the devices providing a seal between a fuel injector and the reception device of the housing on which it is mounted.

The invention applies to all types of turbomachine for aircraft, for example to jet engines and to turboprop engines.

STATE OF THE PRIOR ART

In turbomachines for aircraft of the prior art, injection of fuel into the combustion chamber can be accomplished using two separate types of injection systems, distributed alternately around the longitudinal axis of the turbomachine, where the first type of system provides an enriched injection, and the second type of system provides an unenriched injection.

To prevent inversions in the assembly of the fuel injectors on the housing, which would cause the alternation between the enriched and unenriched injections to be broken, the mounting holes allowing the assembly of the first injectors are positioned according to a first configuration, and the mounting holes allowing the assembly of the second injectors are positioned according to a second configuration different to the first. In other words, the mounting holes are distributed in such a way as to prevent the assembly of a first injector in a position in the housing designed to receive a second injector, and vice versa.

To ensure that the assembly of each injector on its reception device built into the housing is sealed, a sealing joint is interposed between these two elements. This joint has, in the same way as the injector and the reception device of this injector, mounting holes intended to be traversed by the injector's securing screws. Consequently, in order to allow the holes to pass through, the mounting holes of each sealing joint must be aligned with the mounting holes of its associated injector and reception device. Thus, sealing joints according to a first type, with mounting holes positioned according to the said first configuration, are habitually used, in order that they are appropriate for assembly of the first injectors. In addition, sealing joints according to a second type, with mounting holes positioned according to the said second configuration, are also used, in order to be appropriate for assembly of the second injectors.

The fact of having two types of sealing joint poses a substantial risk of reversing them when the injectors are mounted on the housing. These risks are accentuated by the fact that the two types of joint, although they are of different design, can be visually extremely similar. This can lead an operator to make the wrong choice of joint, and not realise this before the securing screws are put in place. The risks of reversal are accentuated still further by the fact that the installation of the joints on the housing's reception devices is generally accomplished with poor visibility in the area, particularly when the operation to assemble the injectors is undertaken with the turbomachine present under the wing of the aircraft, i.e. during the maintenance operations.

When such a reversal occurs the operator often realises their error only when the securing screws are put in place. It is then necessary to remove the injector, and to change the joint; both these operations are very costly in terms of assembly time. In addition, it is possible that the joint chosen in error may have been damaged during the attempted mounting, meaning that it cannot be re-used for mounting another injector. Moreover, the operation to change the joint greatly increases its risks of being lost in the turbomachine, due to its extended handling.

SUMMARY OF THE INVENTION

The purpose of the invention is therefore to provide at least partially a solution to the disadvantages mentioned above, compared with the embodiments of the prior art.

To accomplish this, the object of the invention is firstly a unit for an aircraft turbomachine comprising a housing centred along a longitudinal turbomachine axis, multiple first fuel injection systems, and multiple second fuel injection systems, where each first system comprises:
  a first fuel injector fitted with a first attachment plate traversed by securing screws positioned according to a first configuration on the said first plate;
  a first reception device installed on the said housing, receiving the said first attachment plate with an orifice traversed by the said first fuel injector, an orifice around which mounting holes are located;
  a first sealing joint interposed between the said first plate and the said first reception device, where the said first joint defines an opening traversed by the said first injector, an opening around which mounting holes are located; and
  first securing screws, each extending successively through one of the mounting holes of the first plate, one of the mounting holes of the first sealing joint, and one of the mounting holes of the first reception device, where the said first screws enable the first plate to be attached on to the first reception device,
where each second system comprises:
  a second fuel injector fitted with a second attachment plate traversed by mounting holes positioned according to a second configuration on the said second plate, where the said second configuration is different from the said first configuration;
  a second reception device installed on the said housing, receiving the said second attachment plate with an orifice traversed by the said second fuel injector, an orifice around which mounting holes are located;
  a second sealing joint interposed between the said second plate and the said second reception device, where the said second joint defines an opening traversed by the said second injector, an opening around which mounting holes are located; and
  second securing screws, each extending successively through one of the mounting holes of the second plate, one of the mounting holes of the second sealing joint, and one of the mounting holes of the second reception device, where the said second screws enable the second plate to be attached on to the second reception device,
According to the invention, the first and second sealing joints are identical.

Thus, by using the same sealing joint for all the fuel injectors, the operator is no longer subject to the risk of errors in the choice of joint which they make before assembling these injectors, an assembly for which the foolproofing moreover continues to be provided, as the separate first and second configurations of distribution of the mounting holes on the plates are retained.

Thanks to the invention, there is therefore a certainty that the joint positioned between the attachment plate and the reception device is suitable for the assembly. The operator can thus no longer find themselves in a penalising situation in which they must remove the pre-installed injector and change a joints due to its being inappropriate, since the installed joint is necessarily appropriate for the assembly pending, using securing screws. This feature has a positive impact on the overall time for assembly of the fuel injectors on the housing. In addition, it also takes the tangible form of a reduced handling of the joints, leading to reduced risks that these joints will be lost within the turbomachine.

Finally, the production costs are also advantageously reduced due to the manufacture of sealing joints all of which have a single and unique design, and not two separate designs, as was previously the case.

As an indicative example, the first injectors can be injectors known as "enriched" injectors, and the second injectors can be injectors known as "unenriched" injectors, with preferably an alternating positioning of these two types of injectors around the turbomachine's longitudinal axis. Naturally, any other distribution of the injectors around the turbomachine's longitudinal axis is conceivable, without going beyond the scope of the invention.

Each sealing joint preferably has means for its pre-assembly on its plate.

Thus, it is therefore possible to pre-assemble the joint on the plate of the injector, before putting the latter in position relative to its associated reception device. This firstly facilitates the assembly of the injectors, since it is no longer necessary to handle the joint in proximity to the reception device, an area which is often difficult to access for the operator, especially when the assembly is undertaken with the turbomachine under the aircraft's wing. Consequently, the joints can therefore be positioned on the injectors at some distance from the turbomachine, in an environment with good visibility. This improved visibility not only procures ease of assembly for the operator, but also gives the latter the possibility of inspecting easily and accurately the relative positioning of the mounting holes of the joint and of the plate. Pre-assembly can then be considered as completed when the joint is supported on the plate, in a position allowing perfect compatibility between the mounting holes located in an extension from one to the others, two-by-two. After this, the operator need merely move the unit formed by the injector and its pre-assembled joint to the reception device, and no longer need be concerned with the position of the already fixed joint.

Finally, this pre-assembly also greatly reduces the risks of losing joints within the turbomachine, either during the assembly of the injectors, or during their disassembly during maintenance operations.

The said pre-assembly devices are preferably devices for clipping the joint on to its plate, where the clips used are of a known type, for example clamps, tabs, staples, or similar, preferably cooperating with the periphery of the plate.

Each fuel injection system is preferably designed such that with the said joint pre-assembled on its plate using the said pre-assembly means, only a single relative position between the two allows the passage of the securing screws through all the mounting holes of the joint and of the plate.

This enables it to be guaranteed that the joint can be assembled only in the correct position on its adjacent elements, thereby guaranteeing that the desired sealing is obtained. Indeed, this sole relative position in particular enables it to be guaranteed that the opening of the joint coincides perfectly with the orifice of the reception device compressing this joint. This is notably advantageous when the mounting holes of the joint are distributed such that, without the presence of the pre-assembly means, several separate angular positions are possible for the assembly of the joint on the plate, with the very probable consequence, in the undesired position(s), that the sealing part of the joint is not compressed all around its edge by the reception device.

Such a case can arise notably when the centre of the mounting holes of the joint are contained within a centre circle which is not located on the joint's opening axis.

In light of the foregoing, it is clear that the pre-assembly means, in this preferred configuration, also play a foolproofing role when the joint is assembled.

It should be noted that the said single position allowing the passage of the securing screws through all the mounting holes can be given tangible form by the fact that each of the mounting holes of the plate comes out fully into one of the mounting holes of the joint, and/or also by the fact that as a projection in the plane along its axis, each plate hole is located included in its associated mounting hole of the joint.

For each fuel injection system, the configuration in which the mounting holes are positioned on the plate is preferably identical to the configuration in which the mounting holes are positioned on the associated reception device. Thus, it must be understood that there is an identical positioning of the holes, in terms of number and of layout relative to one another, which does not, however, exclude the possibility of having different shapes and/or diameters for the holes of the plate and those of the reception device. For example, a preferred embodiment consists in having the holes of the plate as holes for the passage of the screws, and the holes of the reception device as threaded holes into which the screws are screwed, where the diameters of all these holes are roughly identical.

The mounting holes of each first plate are preferably positioned such that their centres are distributed over a circle of a first diameter Da, and the mounting holes of each second plate are positioned such that their centres are distributed over a circle of a second diameter Db, which is identical to the first diameter Da. This facilitates the design of a single joint suitable for both configurations.

Each sealing joint preferably has three mounting holes, two of which of circular section, and one of oblong section. In such a case, both rounded ends of the hole of oblong section are circular, of diameter identical to that of the two other holes of circular section. This diameter preferentially corresponds in this case, also roughly, to that of the screws traversing these holes, and to that of the holes of the plate and of the reception device.

With a view to reducing the encumbrance and mass of the single sealing joint, the maximum length of the hole of oblong section, in the direction parallel to both its two opposing parallel sides, is preferably less than twice the diameter of the two rounded ends of this hole of oblong section.

The three holes of the sealing joint are preferably positioned approximately 120° relative to one another.

Each joint is preferably made of metal.

Also, the opening of each joint is defined by an annular inner part of C-shaped transverse section opening inwards, where both branches of the C are compressed respectively by the attachment plate and the reception device. In this configuration each joint preferably has an outer attachment part traversed by its securing screws and supporting the said annular inner part of C-shaped transverse section.

The object of the invention is also a turbomachine for aircraft comprising a unit as described above, cooperating with the turbomachine's combustion chamber.

Finally, another object of the invention is also a process for attaching such a unit, in which, for each first and each second fuel injection system, before the installation of the injector on its associated reception device, the sealing joint is pre-assembled on the said injector.

Other advantages and characteristics of the invention will appear in the non-restrictive detailed disclosure below.

BRIEF DESCRIPTION OF THE DRAWINGS

This description will be made with reference to the attached illustrations, among which.

DETAILED DESCRIPTION OF PREFERRED EMBODIMENTS

Figure 1:
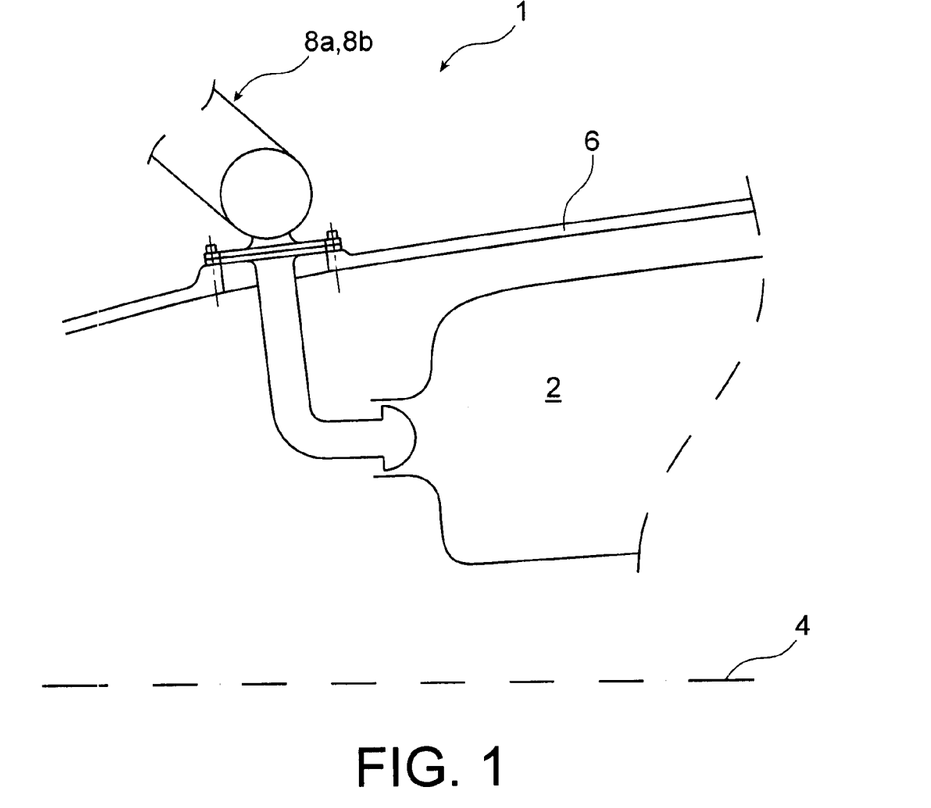
FIG. 1 represents a partial longitudinal half-section view of a turbomachine fitted with a unit according to a preferred embodiment of the present invention.
Figure 2:
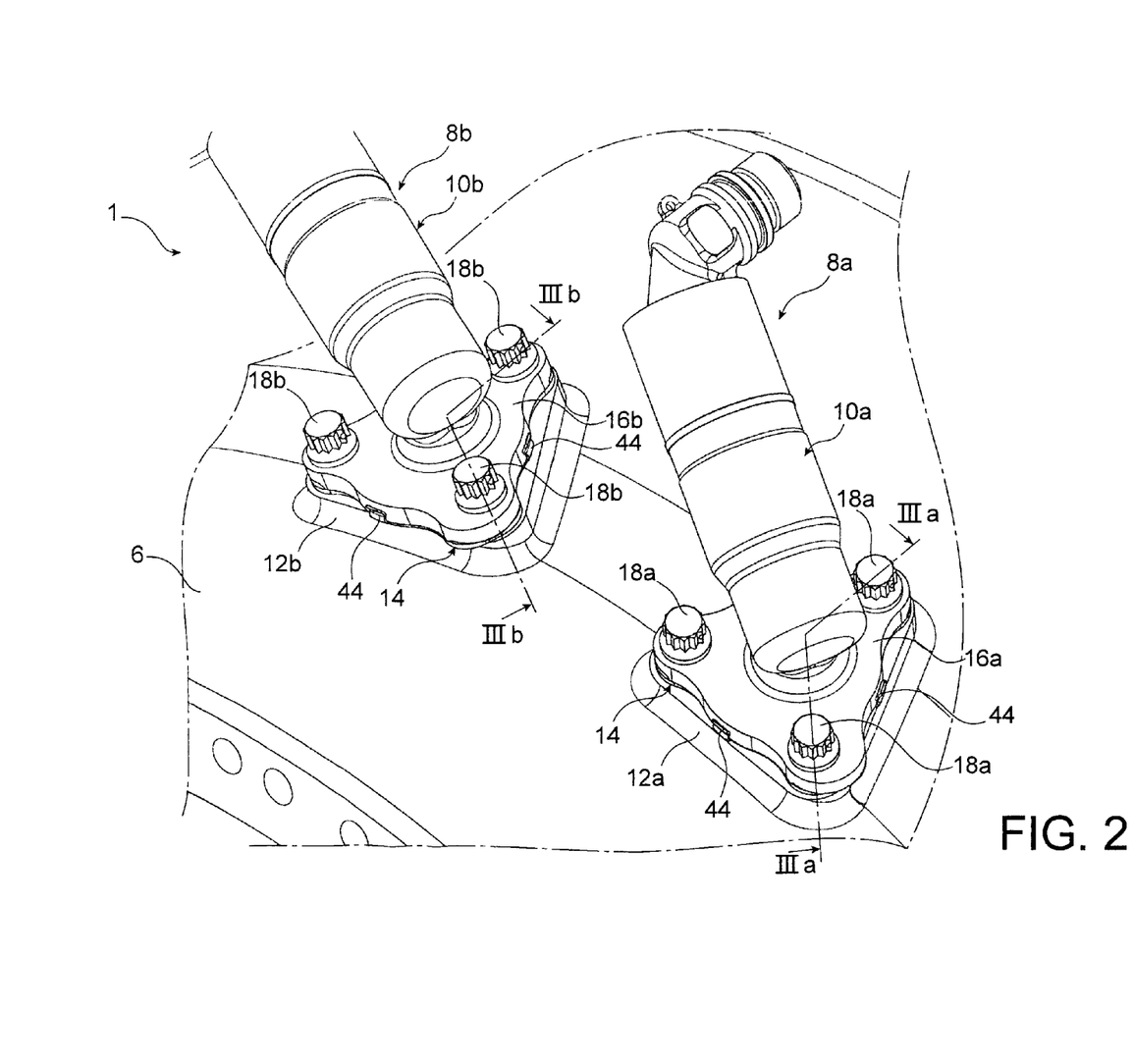
FIG. 2 represents a partial perspective view of the unit shown in FIG. 1.

With reference to FIGS. 1 and 2, a unit 1 for aircraft turbomachine can be seen, where this unit is located in proximity to combustion chamber 2, of annular shape centred on longitudinal axis 4 of the turbomachine. Unit 1, which is also called the injection unit, globally comprises an annular housing 6 centred on axis 4, together with multiple first, 8a, and second, 8b, fuel injection systems, intended to supply combustion chamber 2 with fuel.

The first and second systems 8a and 8b are distributed around axis 4, preferably alternating according to the circumferential direction, also called the tangential direction. For example, the first systems provide an enriched injection of fuel, whereas the second systems provide an unenriched injection of fuel.

More specifically with reference to FIG. 2, each first injection system 8a comprises a first fuel injector 10a, a first reception device 12a forming an integral part of housing 6, taking the form of a boss protruding radially towards outwards, a first sealing joint 14 interposed between device 12a and a first attachment plate 16a incorporated into injector 10a, together with first securing screws 18a, attaching these elements.

Figure 3:
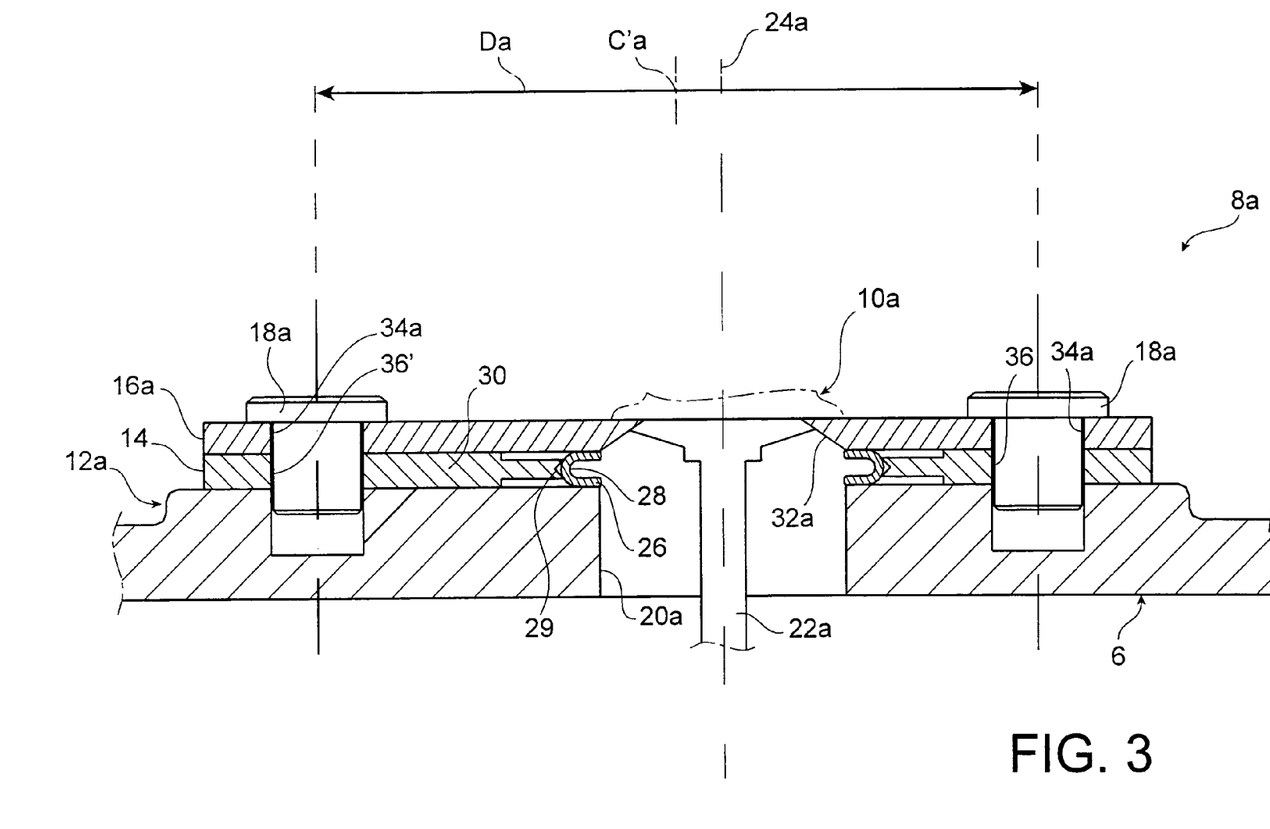
FIG. 3 represents a section view taken along line IIIa-IIIa of FIG. 2.

In FIG. 3, an assembly forming one of the first fuel injection systems 8a can be seen in its assembled state. Firstly, boss 12a forms a flat surface for reception of sealing joint 14, a surface which is traversed by an orifice 20a extending throughout the entire thickness of housing 6 for the passage of the injector, and more specifically for the passage of the injector rod 22a, the free end of which penetrates into the bottom of the combustion chamber. This orifice 20a, of preferentially circular section, extends along a radial axis 24a.

Joint 14, which is supported on the reception surface of device 12a, has an opening 26 which is also centred on axis 24a, and of diameter roughly identical to that of orifice 20a, or slightly smaller as is shown in FIG. 3. Opening 26 is defined by an annular inner part 28 of C-shaped transverse section opening inwards, where both branches of the C are therefore compressed respectively by the inner surface of attachment plate 16a and the reception surface of device 12a. In a known manner, the branches of the C are initially more separated from each other than is shown in FIG. 3, in which their close position corresponds to the state obtained after the securing screws are tightened.

In addition, an outer part of attachment 30 supports the annular inner part 28 of C-shaped transverse section. To accomplish this, outer part 30 can have a groove 29 centred on axis 24a in which is housed the annular inner part 28, along its entire periphery. The outer attachment part 30 is also in outer contact with the inner surface of attachment plate 16a, and in lower contact with the reception surface of device 12a. In addition, it should be noted that both these parts 28 and 30 are preferentially made of metal.

Plate 16a extends around the upstream part of injection rod 22a, and can also have an orifice 32a opening radially inwards, centred on axis 24a, and of diameter roughly identical to that of opening 26 in order to follow the contour of the upper branch of the C which it compresses.

The three elements 12a, 14 and 16a, superimposed in the radial direction corresponding to axis 24a, are pressed together by means of securing screws 18a, traversing mounting holes made in each of the elements. In the preferred embodiments, each screw 18a comprises a head supported on the outer surface of plate 16a, and then extends successively through a mounting hole of the plate in the form of a clearance hole, a mounting hole of the sealing joint also in the form of a clearance hole, and a mounting hole of the reception device in the shape of a threaded hole housing the threaded end of screw 18a.

Figure 4:
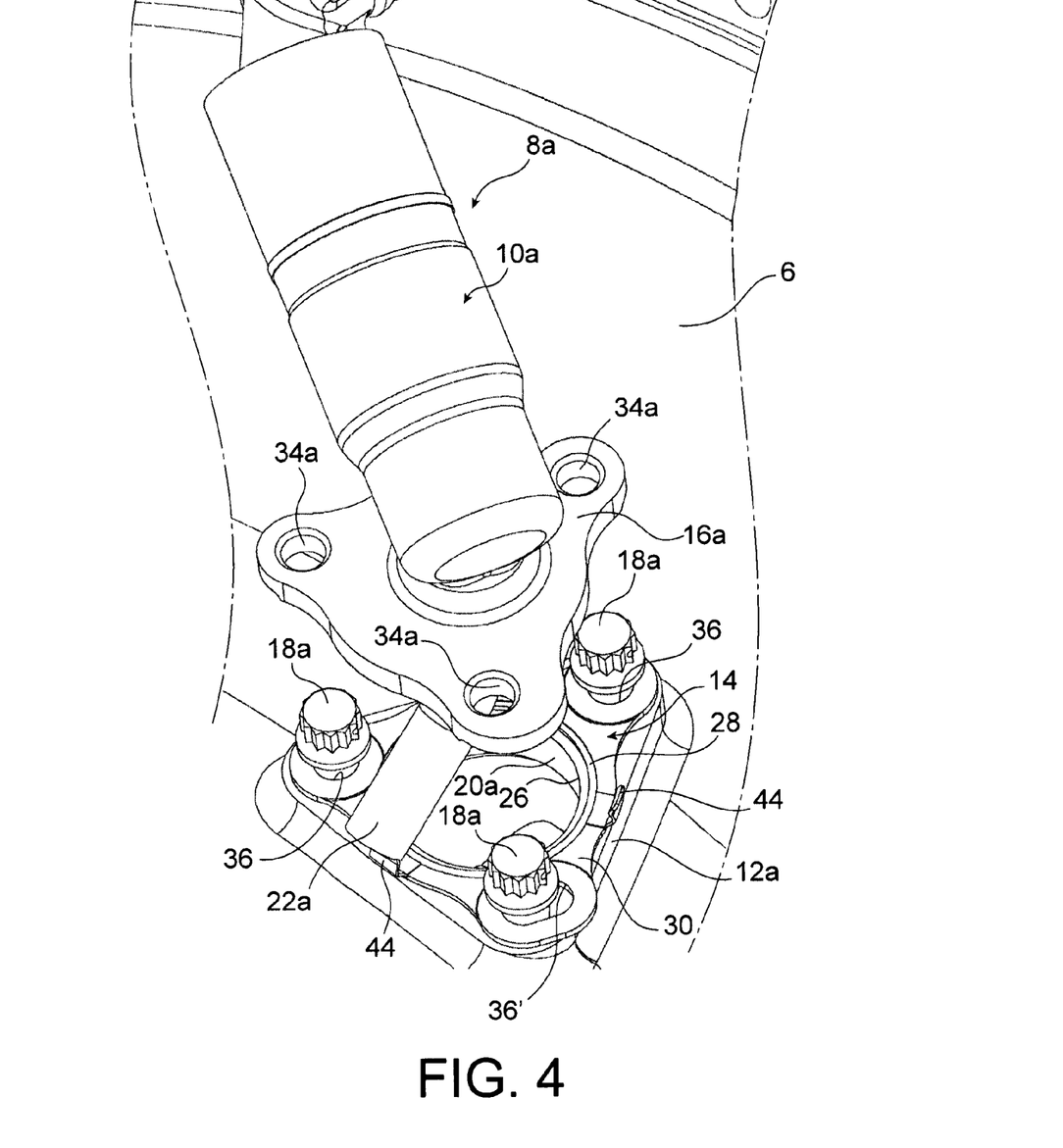
FIG. 4 is a partially exploded perspective view of a first injection system fitted to the unit shown in FIGS. 1 and 2.

As is visible in FIGS. 2 and 4, each of the three elements 12a, 14 and 16a adopts a generally triangular shape, with a mounting hole positioned near each of the three peaks. Consequently, each of the three elements 12a, 14 and 16a has three mounting holes positioned respectively near its peaks, where these mounting holes are aligned for the passage of securing screws 18a. Thus, the superimposition of elements 12a, 14 and 16a is such that the peaks coincide with one another.

More specifically with reference to FIG. 4, showing, for reasons of clarity, injector 10a offset relative to its assembled position in FIG. 2, it can be seen that the three mounting holes 34a of plate 16a are positioned according to a first configuration, i.e. that they are distributed relative to one another in a first manner, in which they are positioned roughly 120° relative to one another. Even if this is not visible in FIG. 4, the threaded mounting holes of device 12a are positioned according to the first configuration, i.e. the axis of a hole 34a of the plate is the same as the axis of a threaded hole of the device, the diameters being, preferably, roughly identical for these six mounting holes, and also roughly identical to that of screws 18a.

Secondly, the three mounting holes traversing the outer part 30 of joint 14 are such that two of them, referenced 36, at also of circular section and of diameter roughly identical to that of the mounting holes of the plate and of the reception device. In addition, a third mounting hole 36', positioned in the area of the remaining peak of joint 14, of generally triangular shape, for its part takes a shape of oblong section, for reasons which will be described in detail below.

It should be noted that the second injection systems 8b each have a design similar to that of the first injection system 8a which has just been described with reference to FIGS. 2 to 4. In particular, FIG. 3 represents not only the first injection system 8a considered according to line IIIa-IIIa of FIG. 2, but also the second injection system 8b taken along line IIIb-IIIb of this FIG. 2.

Figure 5:
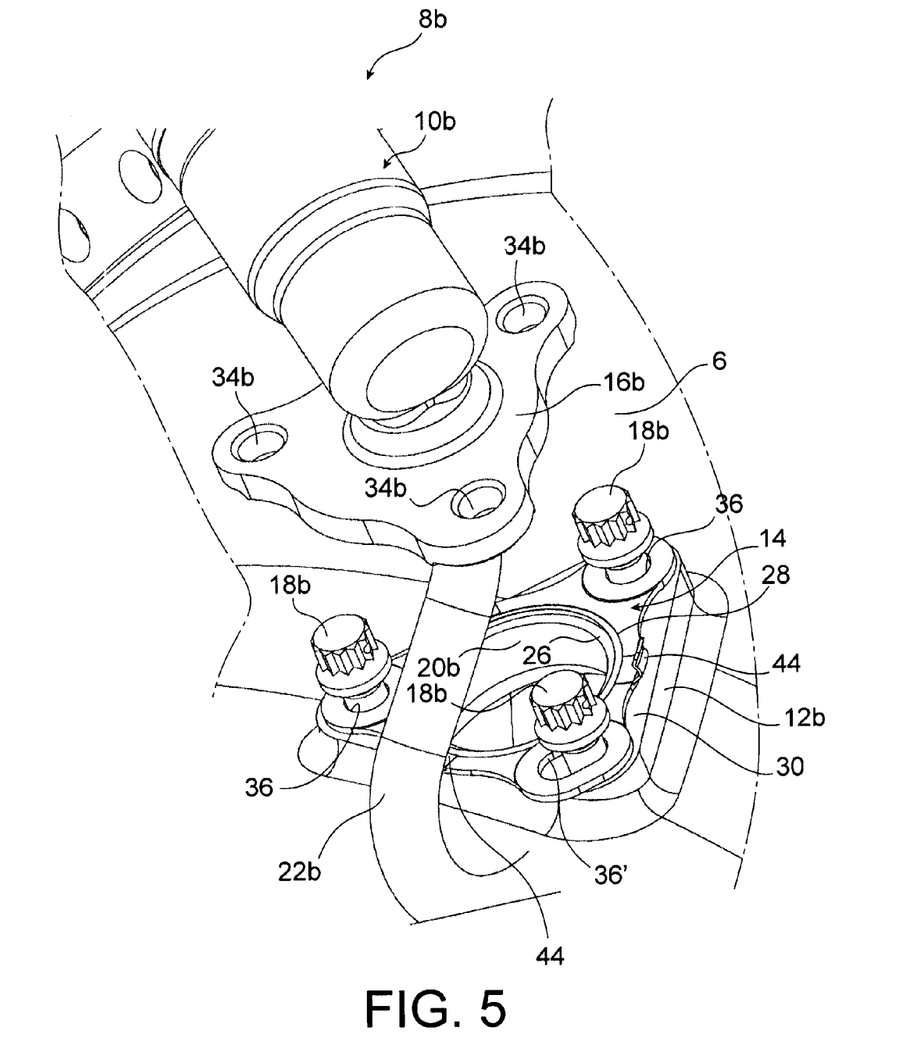
FIG. 5 is a partially exploded perspective view of a second injection system fitted to the unit shown in FIGS. 1 and 2.

The sole difference of the second injection system 8b shown in FIG. 5, with the first system 8a described previously, preferably lies in the fact that the mounting holes 34b are positioned on their second attachment plate 16b according to a second configuration, different from the first configuration described above. The same naturally applies for the mounting holes of reception device 12b. This enables the first plates 16a to be prevented from being assembled on the second reception devices 12b, and vice versa, such that genuine foolproofing is obtained in assembling the injectors on the housing.

Due to the almost identical design between the first and second injection systems, the latter systems will not be described in greater detail. Nevertheless, it should be noted that in the figures bearing the same numerical references, whether they are followed by the letter "a", in the case of the first injection systems, or by the letter "b", in the case of the second injection systems, correspond to identical or similar elements.

In particular, an essential characteristic of the present invention lies in the fact that although the first and second configurations for the positioning of the holes are distinct for the first and second attachment plates 16a and 16b, the sealing joints 14 are, for their part, identical in the first and second injection systems 8a and 8b.

Figure 6:
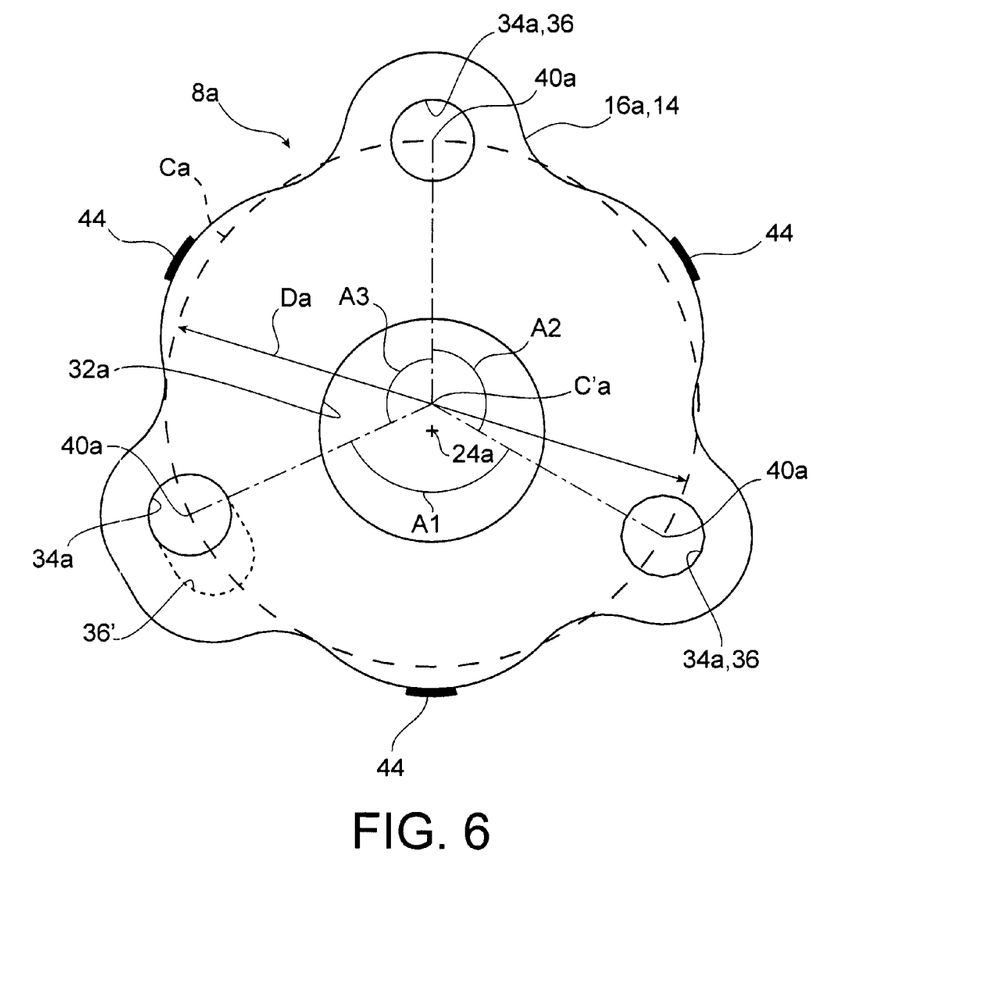
FIG. 6 shows, as seen from above, the attachment plate of a first injection system of the unit, on to which plate its associated sealing joint is attached.

With reference to FIG. 6, the first plate 16a can be seen, as seen from above, i.e. along axis 24a of its orifice 32a, and of the opening (not represented) of sealing joint 14 located below this plate, which is almost invisible due to the perfect coincidence of these two superimposed elements 16a and 14.

In this figure it can be seen that the centres 40a of the mounting holes 34a are positioned according to a first circle Ca of first diameter Da, the centre C'a of which is not located on axis 24a, even if this could be so, without going beyond the scope of the invention. In the assembled state represented in this FIG. 6, there is perfect coincidence between the two holes 36 of the joint and their two associated holes 34a of the plate, notably implying that each of the two holes 34a opens fully into its associated joint hole 36. Moreover, both holes 36 and 34a positioned as an extension one of the other, have their projections, along their common axis, which are fully identical.

Concerning the third mounting hole 34a of the plate, this hole also opens fully into the third oblong hole 36' of joint 14, even if, as a projection according to the axis of hole 34a, the surface of this hole 34a is lower, and fully included, in the surface of the oblong hole 36' represented with dashed lines.

With this regard, it should be noted that the maximum length of the hole of oblong section 36', in the direction parallel to its two opposing parallel sides, is less than twice the diameter of the two rounded ends of this oblong hole, where the abovementioned diameter is preferentially identical to that of the two other holes 36 of joint 14, and to that of the screws 18a. For this first injection system 8a, the third mounting hole 34a of the plate coincides with a left-hand end of the hole of oblong section 36', as is visible in FIG. 6.

Sealing joint 14 has means for pre-assembly on to plate 16a, which preferably take the form of clips, and more preferably the form of elastic tabs 44 protruding from the edge of the outer part 30 of the joint, and which grip the peripheral edge of the plate. There are preferably three such tabs, one for each side, and they therefore enable joint 14 to be held on to plate 16a, due to the tightening efforts exerted by each of the tabs on the peripheral edge of the plate. When the pre-assembly means 44 cooperate with the plate, only the relative position represented in FIG. 7 between the plate and the joint allows the passage of the securing screws through the holes 34a, 36 and 36'. In other words, even if the pre-assembly means do not necessarily prevent joint 14 from swivelling relative to plate 16a, on to which it is pre-assembled, a single relative position between the two enables perfect coincidence to be obtained between holes 36 and 34a, a position in which the third hole 34a is therefore entirely freed by oblong hole 36'. This enables it to be guaranteed that the joint can be assembled only in the correct position on to its adjacent elements, thereby guaranteeing that the desired sealing is obtained. Indeed, this sole relative position in particular enables it to be guaranteed that opening 26 of the joint coincides perfectly with orifice 20a of the reception device 12a compressing this joint, in order that they are coaxial with axis 24a, in order to obtain a close contact along the entire length of their peripheries.

Figure 7:
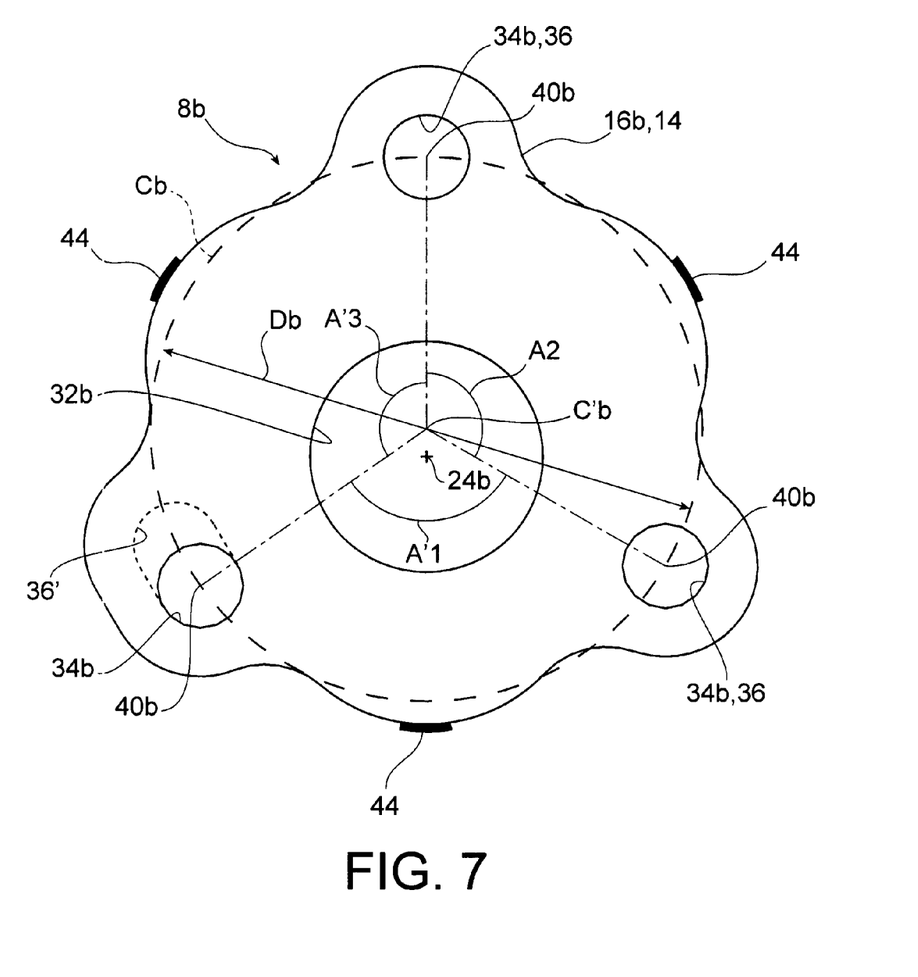
FIG. 7 shows, as seen from above, the attachment plate of a second injection system of the unit, on to which plate its associated sealing joint is attached.

Each angle A1, A2 and A3, of centre C'a formed between two centres 40a of mounting holes 34a, is approximately equal to 120°.

In FIG. 7 relative to the second injection system 8b, it can be seen that the sole relative position between joint 14 and plate 16b, allowing the passage of the securing screws while the pre-assembly means 44 of the joint cooperate with the plate, is such that the third mounting hole 34b of the plate coincides with a right-hand end of the hole of oblong section 36'. In the represented preferred embodiment, it should be noted that the first diameter Da is equal to the second diameter Db on which are shown the centres 40b of the mounting holes 34b of plate 16b. Lastly, if angle A2 between the two holes 34b of circular section can be identical to that between the two holes 34a of circular section of the first plate, the other two angles A'1 and A'3 are such that they differ respectively from the abovementioned angles A1 and A3, even if a case can exist in which angle A'1 is equal to angle A3, and angle A'3 equal to angle A1.

Figure 8:
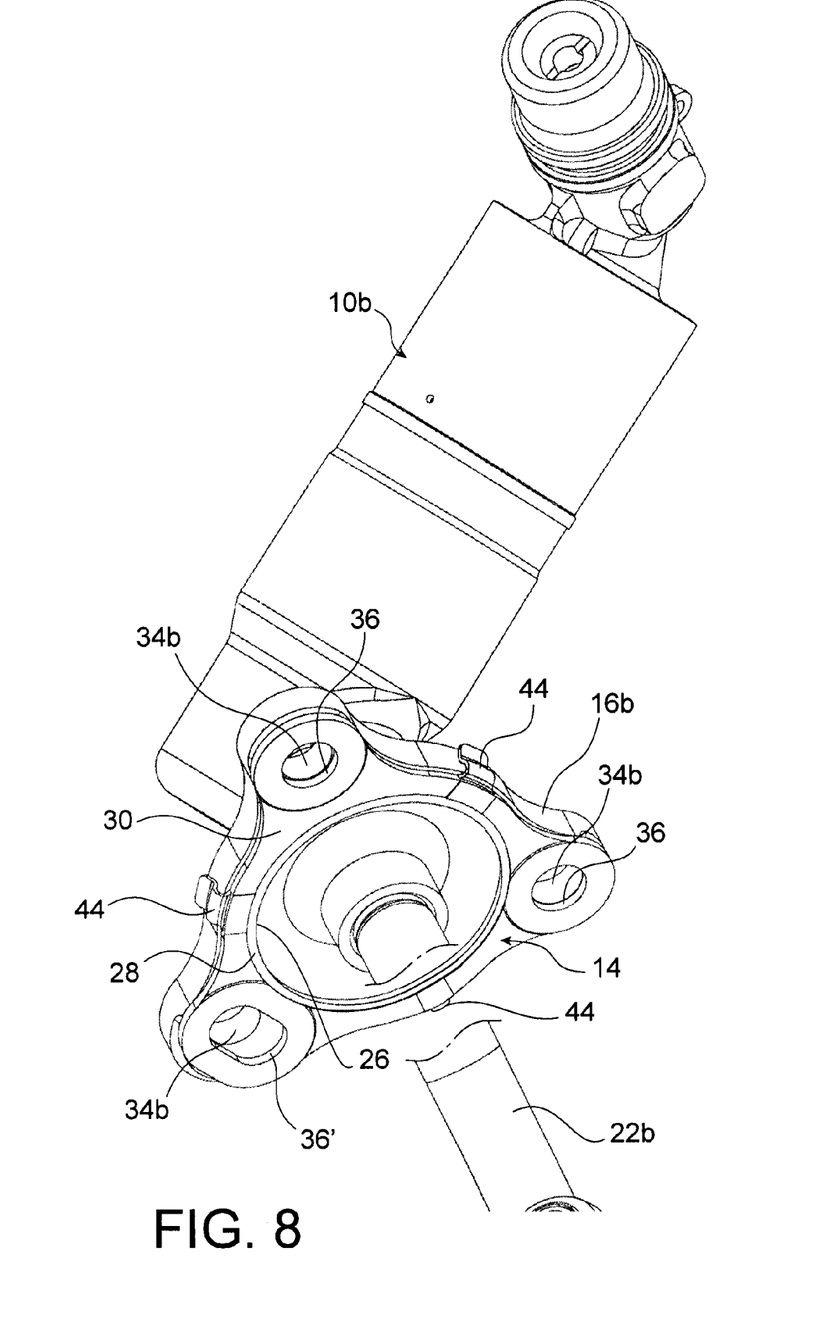
FIG. 8 represents a perspective view of a second injector fitted with its sealing joint occupying its correct position relative to the attachment plate of this injector.

FIG. 8 shows one of the second injectors 10b, during a process of assembly of the fuel injection unit. Before bringing this injector close to its definitive position on the housing, joint 14 is pre-installed on plate 16b of the injector, using the three tabs 44 gripping the peripheral edge of the plate. Pre-installation is completed when joint 14 is supported on plate 16b, in a position allowing perfect alignment between mounting holes 34b, 36 and 36', aligned with one another, two-by-two. This position, shown in FIG. 8, is also that shown in FIG. 7.

Figure 9A:
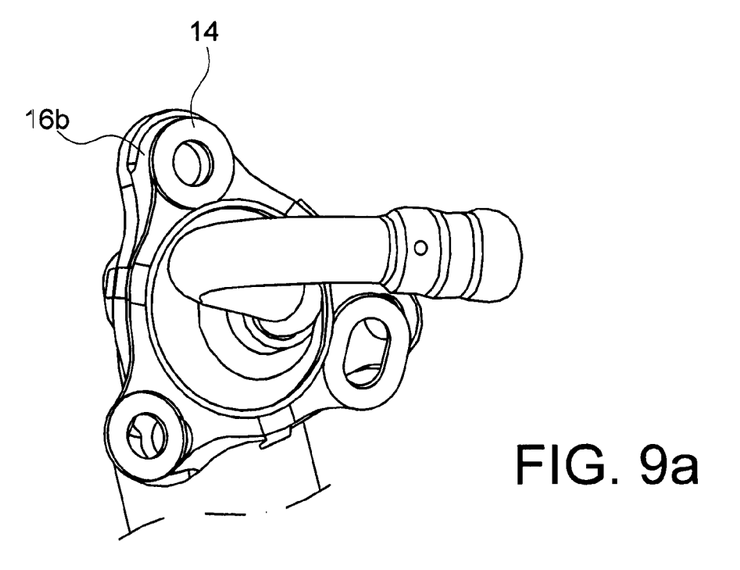
FIGS. 9a and 9b represent views similar to that of FIG. 8, with the sealing joint occupying erroneous positions relative to the attachment plate of this injector.
Figure 9B:
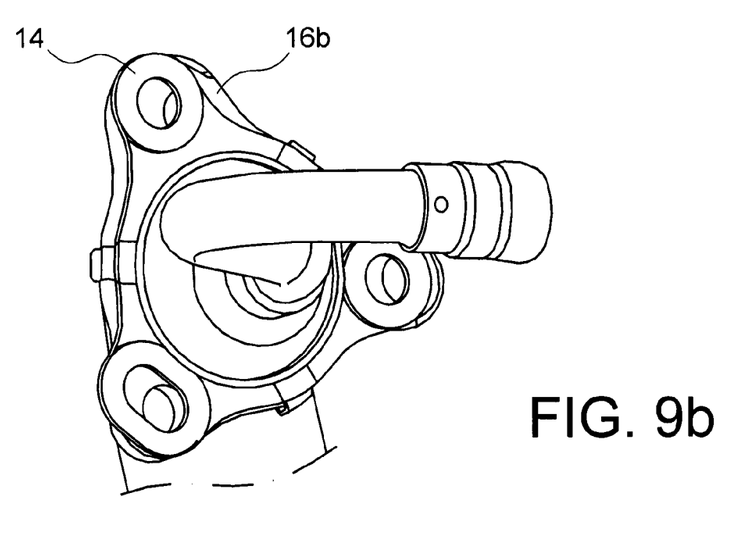

With this regard, FIGS. 9a and 9b show examples of relative positions between joint 14 and plate 16b, prohibiting the passage of the securing screws, due to the fact that not all their mounting holes coincide. Starting with the two erroneous positions represented, the operator cannot attain the sole correct position of the joint simply by rotating the latter relative to the plate with which its tabs cooperate. In order to attain this correct relative position, they must remove the joint, and then put it back in place on the plate in a position close to this correct relative position, which may then be obtained, if necessary, by a slight rotation of the joint in order to obtain perfect coincidence between the holes, allowing subsequent passage of the screws.

When the pre-assembly means are in position and the sole relative position has been adjusted by the operator, they need merely move the unit formed by the injector and its pre-assembled joint to the reception device, and no longer need be concerned with the position of the previously fixed joint.

A comparable operation is clearly required for the first injectors of the unit.

Naturally, various modifications can be made by the skilled man in the art to the invention which has just been described, solely as non-restrictive examples.

The invention claimed is:

1. A unit for an aircraft turbomachine comprising:
   a housing centered on a longitudinal axis of a turbomachine;
   multiple first fuel injection systems; and
   multiple second fuel injection systems,
   wherein each first system comprises:
      a first attachment plate with first attachment plate mounting holes;
      a first fuel injector fitted with the first attachment plate according to a first configuration on said first attachment plate;
      a first reception device installed on said housing, receiving said first attachment plate with an orifice traversed by said first fuel injector, with first reception device mounting holes located around the orifice;
      a first sealing joint interposed between said first attachment plate and said first reception device, where said first joint defines an opening traversed by said first injector, with first sealing joint mounting holes located around the opening; and
      first securing screws, each extending successively through one of the mounting holes of the first plate, one of the mounting holes of the first sealing joint, and one of the mounting holes of the first reception device, where said first screws enable the first plate to be attached on to the first reception device,
   wherein each second system comprises:
      a second attachment plate with second attachment plate mounting holes;
      a second fuel injector fitted with a second attachment plate traversed by the second attachment plate mounting holes positioned according to a second configuration on said second plate, where the position of the second attachment plate mounting holes in said second configuration is different from the position of the first attachment plate mounting holes in said first configuration;
      a second reception device installed on said housing, receiving the second attachment plate with an orifice traversed by said second fuel injector, with second reception device mounting holes located around the orifice;
      a second sealing joint interposed between said second plate and the said second reception device, where the second joint defines an opening traversed by the second injector, with second sealing joint mounting holes located around the opening; and
      second securing screws, each extending successively through one of the mounting holes of the second plate, one of the mounting holes of the second sealing joint, and one of the mounting holes of the second reception device, where the second screws enable the second plate to be attached on to the second reception device, and
   wherein the first and second sealing joints are identical.

2. A unit according to claim 1, wherein at least one sealing joint is pre-assembled with an attachment plate.

3. A unit according to claim 2, wherein the at least one sealing joint is pre-assembled by clipping on to at least one attachment plate.

4. A unit according to either of the claim 2 or 3, wherein configuration of the first and second fuel injection systems results in a single relative position between the joint and at least one attachment plate allows the passage of the securing screws through all the mounting holes of the joint and of the at least one attachment plate.

5. A unit according to claim 1, wherein for each fuel injection system the configuration according to which the mounting holes are positioned on the plate is identical to the configuration according to which the mounting holes are positioned on the associated reception device.

6. A unit according to claim 1, wherein the mounting holes of each first plate are positioned such that their centers are distributed over a circle of a first diameter, and the mounting holes of each second plate are positioned such that their centers are distributed over a circle of a second diameter, which is identical to the first diameter.

7. A unit according to claim 1, wherein each sealing joint has three mounting holes, two of which of circular section and one of oblong section.

8. A unit according to claim 7, wherein both rounded ends of the hole of oblong section are circular, of diameter identical to that of the two other holes of circular section.

9. A unit according to claim 7, wherein the maximum length of the hole of oblong section, in the direction parallel to its two opposing parallel sides, is less than twice the diameter of the two rounded ends of this hole of oblong section.

10. A unit according to any of the claim 7, wherein the three holes of the sealing joint are positioned approximately 120° relative to one another.

11. A unit according to claim 1, wherein each joint is made of metal.

12. A unit according to claim 1, wherein the opening of each joint is defined by an annular inner part of C-shaped transverse section opening inwards, where both branches of the C are compressed respectively by the attachment plate and the reception device.

13. A unit according to claim 12, wherein each joint has an outer attachment part traversed by its mounting holes and supporting the said annular inner part of C-shaped transverse section.

14. A turbomachine for aircraft comprising an engine unit according to claim 1.

15. A process for assembling a unit according to claim 1, wherein for each first and each second fuel injection system, before the installation of the injector on its associated reception device, the sealing joint is pre-assembled on the said injector.

* * * * *